July 5, 1960  H. F. ZINK  2,943,355
GLASS CONVEYING DEVICE AND METHOD OF MAKING SAME
Filed Aug. 3, 1955  3 Sheets-Sheet 1
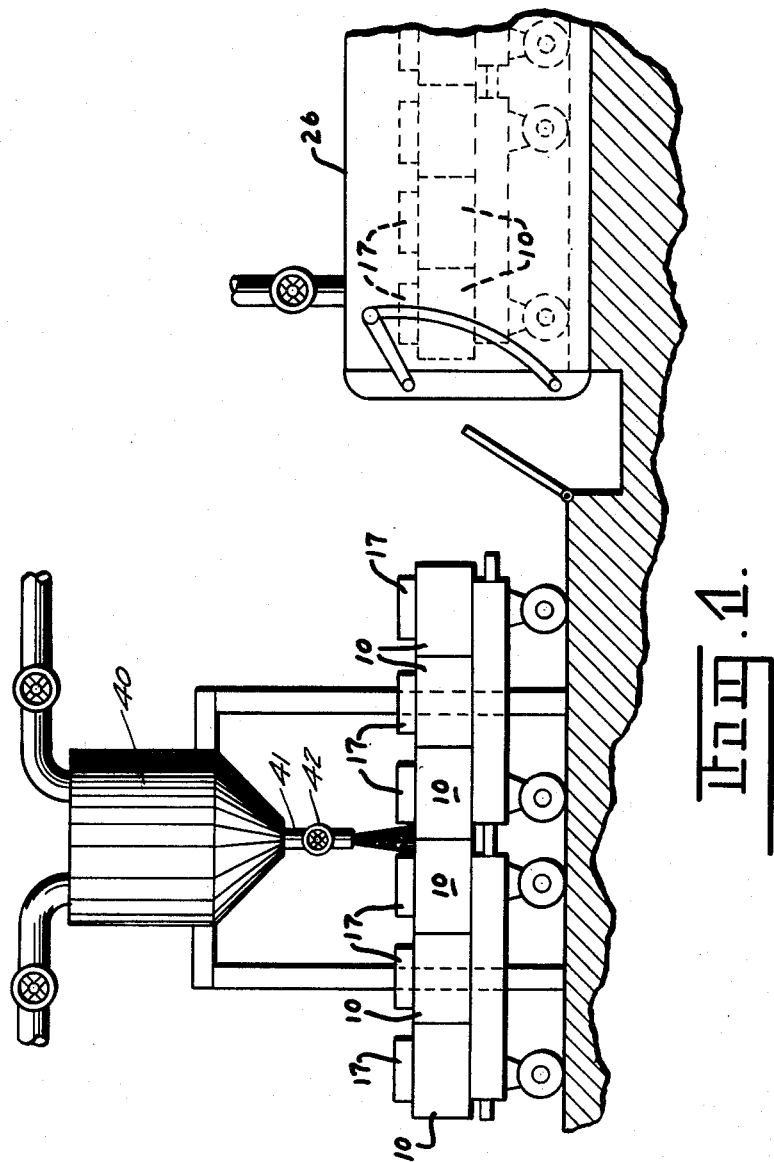
INVENTOR.
HAROLD F. ZINK July 5, 1960  H. F. ZINK  2,943,355
GLASS CONVEYING DEVICE AND METHOD OF MAKING SAME
Filed Aug. 3, 1955  3 Sheets-Sheet 2
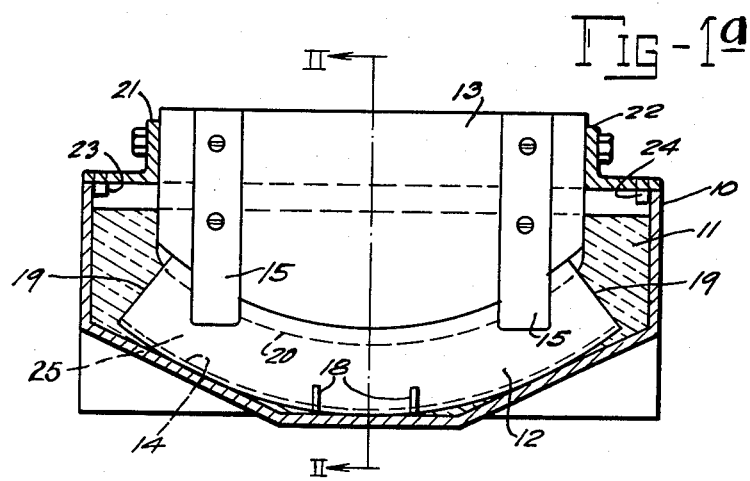
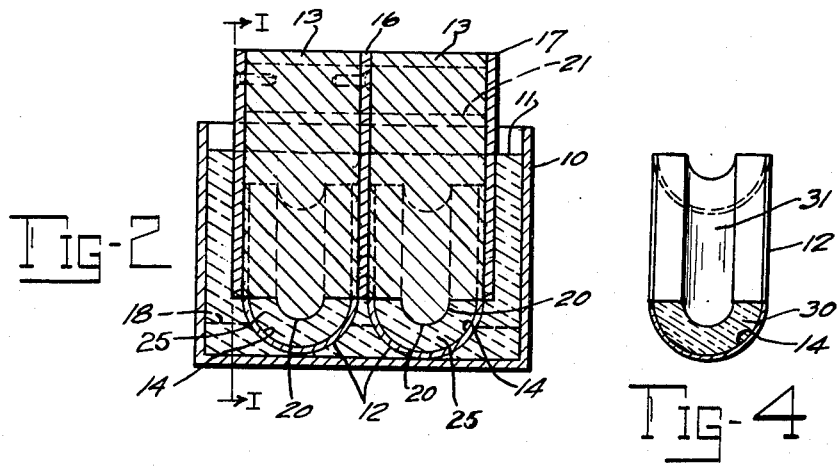
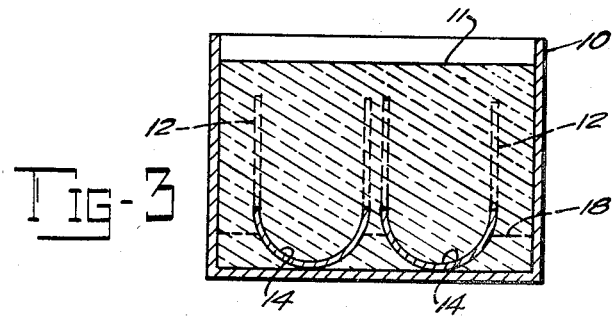
INVENTOR.
HAROLD F. ZINK
ATTORNEYS July 5, 1960 H. F. ZINK 2,943,355
GLASS CONVEYING DEVICE AND METHOD OF MAKING SAME
Filed Aug. 3, 1955 3 Sheets-Sheet 3

INVENTOR.
HAROLD F. ZINK

United States Patent Office 2,943,355
Patented July 5, 1960

2,943,355

GLASS CONVEYING DEVICE AND METHOD OF MAKING SAME

Harold F. Zink, Toledo, Ohio, assignor to Owens-Illinois Glass Company, a corporation of Ohio Filed Aug. 3, 1955, Ser. No. 526,183

5 Claims. (Cl. 18—47.5)

This invention relates primarily to devices for conveying or handling hot or molten glass from a source of supply to shaping or handling devices.

Preferably this device is used in transporting charges of molten glass from a glass feeding device to the molds of a forming machine but it is also applicable for use in the transporting or handling of shaped hot glass articles.

In the usual transporting of gobs or charges of molten glass, the chutes or guideways are made of materials which tend to restrict the speed of passage of the charge thereover and at the same time, extract heat from one side of the charge. This of course means that when the charge is deposited in the mold for shaping into an article, that the walls of the article will be heavier on one side than on the other. This uneven distribution is due to the chill imparted by the contact with the gob guiding device.

It is the primary object of this invention to provide a method of producing these gob guides from a particular type of porous material which will obviate such adverse conditions.

It is a further object to produce these gob guides in final molded form so that no further work is required prior to their placed in actual use.

It is also an object to produce a plurality of these gob guides simultaneously.

It has been found that an excellent material for use in gob guides is a mixture of synthetic xonotlite and graphite, the composition being preferably approximately 50% of xonotlite and 50% graphite by weight of the solids. A mixture of lime, silica and water, the lime and silica being present in the mixture in the molar ratio of 1:1 is mixed in a mixer 40. The water in said mixture is present in a quantity at least sufficient to permit the conversion to xonotlite. When the mixture is completed a series of mold assemblies 10 and 17 may be passed beneath a nozzle 41 where the mixture will be poured into these molds under control of valve 42. The mold assemblies are them moved into the indurator 26 where the molds and their contents are subjected to a pressure and temperature in excess of 125 p.s.i. and 173° C. respectively and for a time period depending upon the volume and viscosity of the slurry. The amount of water in the slurry controls not only the viscosity but also the density of the end product. The resultant product from the induration of the above mixture will have the chemical formulae 5CaO·5SiO$_2$·H$_2$O. Gob chutes made of this material will support glass at a temperature up to approximately 1500° F., without the material and the glass sticking to each other. This material will also hold its shape under such temperatures. Extended use of this material at 1500° F., does not seem to be harmful to the main xonotlite structure.

In this method a container is provided which will hold a predetermined quantity of a lime-silica-graphite aqueous slurry in a water to solids ratio such as to provide any desired porosity in the reacted product. There is positioned or immersed in this container, a metal or inorganic form or forms having the desired external shape of the gob guide.

The slurry is then poured into the container to a depth sufficient to cover the height of the said forms and to completely surround them on all sides. An inner molding member is then positioned in and upon the forms displacing some of the slurry therefrom and forming therewith a sort of open-ended unsealed mold.

In this manner the mold per se is thus completely immersed in and surrounded by the slurry and there is no entrapment of air. If the inner molding cavity portion of the assembled mold parts is of sufficient size or area, the mold parts may be assembled in the container and then the slurry poured therein.

With completion of the mold assembly within the slurry, the container with its slurry and the mold is placed in an indurator and subjected to a pressure and temperature in excess of 125 p.s.i., and 173° C., respectively, for a period of time, the duration of which depends upon the volume and viscosity of the slurry but being at least sufficient to convert the slurry to a crystalline structure having either the chemical formula $$5CaO·5SiO_2·H_2O·$$

or 4CaO·5SiO$_2$·5H$_2$O· or a combination of both crystals. At the end of the indurating period the container is removed from the indurator, the top of the mold is removed, and then the forms with the reacted material adhering thereto, are removed.

When metal forms are used as the lower portion of the mold the interior surface portions of the metal forms will be sandblasted prior to their immersion, to provide an excellent bond as between their inner surfaces and the contacting material, whereas the exterior surfaces of the forms not being sandblasted, permit the easy stripping of the reacted material therefrom. Thus, a part of the mold then becomes a part of the end product and provides a means of mounting the guides and increasing their rigidity in their ultimate end use position.

This immersion molding and reacting method provides a condition wherein any expansion and contraction, which may occur during the induration, will not affect the molded form because any such expansion or contraction is equalized upon all sides of the molded form and obviates the necessity of having a completely sealed mold.

The slurries to be utilized herein, may be of various compositions capable of producing various calcium silicate products, but the preferred composition is finely divided lime and silica in a molar ratio of 1:1, finely divided graphite present by weight as 50% of the dry solids and being equally dispersed therethrough and a water to solids ratio of approximately 1.8:1 to provide thereby a reacted end product having a density of approximately 30 p.c.f. It is contemplated that other slurries may also be provided wherein the lime and silica may be present within the molar ratio range of from 0.6:1 up to 1:1; whereby an end product may be matured in a density range of from 10 p.c.f., up to approximately 50 p.c.f., a water to solids ratio ranging from 0.5:1 to 7:1 by weight and wherein the graphite content will be such as to be not in excess of 75% of the dry solids of the slurry by weight. It is also contemplated that several of the illustrated or different shapes may be formed simultaneously or they may be produced singly. Also, it is the intention to produce any desired shape whether regular or irregular in shape but which will lend itself to this method of production.

While this invention may be embodied in various constructions, particular embodiments are shown in the accompanying drawings, in which:

Fig. 1 is an elevational view illustrating the apparatus for mixing, molding and indurating the slurry material and for carrying out this present method;

Fig. 1a is a vertical elevational view taken at line I—I on Fig. 2;

Fig. 2 is a cross-sectional elevation taken at line II—II on Fig. 1;

Fig. 3 is a cross-sectional view at approximately line II—II on Fig. 1 showing the mold closing member removed;

Fig. 4 is a part sectional view of the finished guide or chute; and

Figure 5:
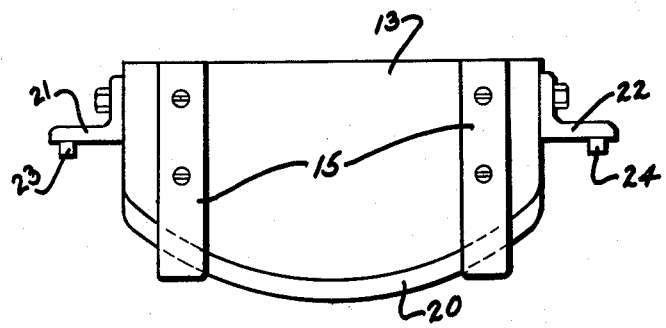
Figure 6:
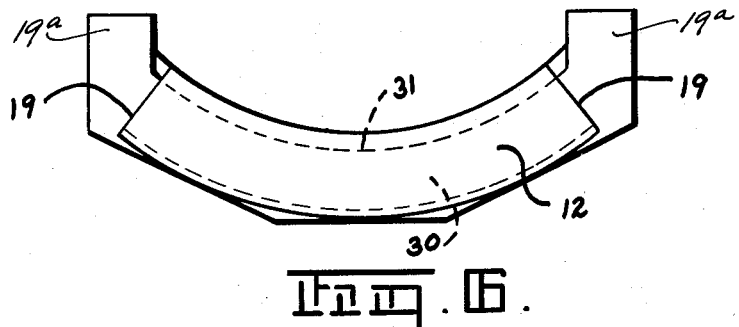
Figure 7:
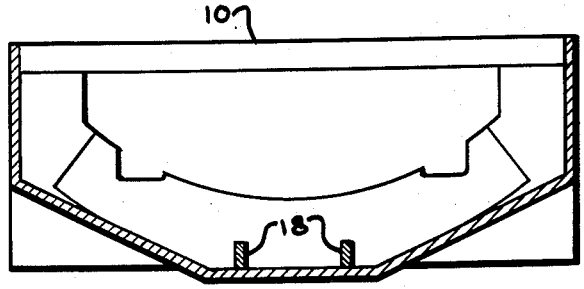

Figs. 5 to 7 inclusive are illustrative of the sections of the mold assembly and also illustrate the manner of separation of the mold sections, i.e., Figs. 5 and 7 show the mold sections as separated, leaving the molded element as Fig. 6.

In Fig. 1 of the drawings there is shown a container 10, filled with slurry 11 and having a rigid support or mold member 12 and a mold closing member 13 in assembled position and immersed in the slurry. Guide members 15, 16, and 17 extend downwardly from the mold closing member 13 and along the sides of the support members 12, thus aligning the mold members 13 and support members 12 in assembled relation. Spacers 18 properly positioned in container 10, support the members 12 in aligned relationship. The inner surface areas 14 of the members 12 are sandblasted to provide a condition whereby the slurry 11 may bond thereto during the reaction. Member 12 may be metal or other rigid material and is an expendable member in that it becomes an integral part of the end product and is replaced in each successive molding operation. Each of the mold members 13 have a semi-circular extension 20 on their lower ends which act to impart shape to the upper surface areas of the end product and to any desired contour. This surface is treated in a manner to prevent any bonding as between the end product and said surface. In the illustrated instance a half-round shape 20 is imparted to provide the desired contour for guiding the gobs of molten glass. These gobs are elongated and have a round cross sectional shape which it is desirable to retain until deposited in a molding device. Members 21 and 22, pins 23 and 24, and guides 15, 16, and 17 maintain the mold closing members 13 in their desired horizontal and vertical alignment with respect to the container 10 and forms 12 and these parts form thereby a molding assembly having a shaping cavity 25 submerged beneath the level of the slurry 11 in container 10. This assembly forms a shaped cavity portion 25 or area in the slurry and beneath the level thereof. The surface areas of members 13 where they will be in slurry contact may be coated with a mold release to render easy their removal from the integrated material.

With the mold parts in the assembled position in the container 10 as shown in Fig. 1 and the container 10 filled with slurry, the assembly is then placed in an indurator 26 and subjected to a steam pressure ranging upwardly from 125 p.s.i., and its corresponding temperature for a time period sufficient to completely react the slurry to form a crystalline calcium silicate body, wherein the crystals have either the chemical formula $$5CaO \cdot 5SiO_2 \cdot H_2O \cdot$$
$$4CaO \cdot 5SiO_2 \cdot 5H_2O \cdot$$

or a combination of both and having said crystalline structure in integrated form, the crystals forming a three-dimensional network interspersed with voids, the aggregate volume of the voids being in excess of the volume of the crystals, and having graphite particles evenly and equally dispersed and imbedded throughout the crystalline body thereof.

With the completion of the induration, the assembly is removed from the indurator 26, the mold closing members 13 are removed from the assembly, and the indurated product with the imbedded members 12 is removed from the container 10. Thereafter, the excess of indurated material is easily stripped from the outer areas of the forms 12, the ends 19a are trimmed at the line 19, leaving a gob guide or chute member 30 (Fig. 4) bonded to the inner surface areas of form 12 and having a smooth shaped guide area or surface 31. Said member or body 30 being a crystalline structure of a hydrous calcium silicate.

The said crystalline body structure 30 preferably having an apparent density of approximately 30 p.c.f., the calcium silicate in the body structure being essentially xonotlite, tobermorite or a combination of both and having graphite particles present in an amount not in excess of approximately 75% by weight of the dry solids of the starting slurry. Such a body will present a condition in the surface of a gob guide or chute wherein the speed of travel of the gob over the surface thereof, has the least restriction and wherein the temperature of the gob is least affected during its travel thereover. Such a body will also present a surface area for contact with the hot glass of shaped articles which will tend to extract the least amount of heat therefrom and prevent marring of the surface of the article in contact therewith. These various outstanding characteristics are due essentially to the high porosity or insulating value of the base structure 30 of the final product and the continuity of and constantly appearing particles of graphite along surface 31 as that surface may erode when under use.

In some instances it is contemplated that the surface areas 14 of member 12 will not be sandblasted so that when the xonotlite-graphite material is indurated it will not adhere to the metal member 12 and thus a plain or unsupported member will be molded. Such a member may be inserted in a holder member at the point of end use. This procedure will also obviate the need of expendable members 12.

Various shapes and sizes of articles may be produced in accordance with this present invention and for the various purposes and uses set forth herein.

Modifications may be resorted to within the spirit and scope of the appended claims.

I claim:

1. The method of forming gob guides which comprises providing a container for a body of reactable aqueous slurry of lime, silica and water, the lime and silica being present in a molar ratio of approximately 1:1, the water to solids ratio being approximately 1.8:1, the graphite being present in an amount of 50% by weight of the dry solids of the slurry, positioning an assembly of shaping members within said slurry to project beneath the top surface thereof, indurating said body of slurry with the contained shaping members therein at a pressure and temperature in excess of 125 p.s.i. and 173° C. respectively to substantially completely react the same to form reacted and shaped body portions bonded along their lengths to portions of the inner surface areas of said shaping members, separating said assembly and separating said shaped body portions from the reacted body.

2. The method of forming gob guides which comprises providing a container for a body of reactable aqueous slurry of lime, silica and graphite, the lime and silica being present in a molar ratio of approximately 1:1, the water to solids ratio being not in excess of 7:1 by weight, the graphite being present not in excess of 75% by weight of the dry solids of the slurry, positioning an assembly of shaping members within said slurry to project beneath the top surface thereof, indurating said body of slurry with said shaping members therein at a pressure and temperature in excess of 125 p.s.i. and 173° C. respectively to substantially completely react same and form shaped and reacted partially segregated body portions therein, said reacted body portions being bonded along portions of the inner surface areas of their length to the said shaping members and separating said shaped body portions from the reacted body.

3. The method of forming gob guides which comprises providing a container for a body of reactable aqueous slurry, said slurry comprised of lime, silica and graphite, the graphite being present not in excess of 75% by weight of the dry solids of the slurry, the water to solids ratio being within the range of from 0.5:1 to 7:1 by weight, positioning an assembly of molding members within said container in such manner as to define a shaped body portion within said slurry body, filling said container with said slurry, indurating said body of slurry with the shaping members therein at a pressure and temperature in excess of 125 p.s.i. and 173° respectively to substantially completely react same, and separating said defined shaped portion from the reacted body.

4. The method of forming guides for hot glass which comprises providing a container for a body of reactable aqueous slurry of lime, silica and graphite, the graphite being present not in excess of 75% by weight of the dry solids of the slurry, the water to solids ratio being within the range of from 0.5:1 to 7:1 by weight, positioning an assembly of shaping members within said slurry container, a supporting and shaping member forming one side of said shaping assembly, filling said container with said slurry, indurating said body of slurry with said contained assembly at a pressure and temperature in excess of 125 p.s.i. and 173° C. respectively and to substantially completely react same and bond same to said support member, and removing said shaped portion and said bonded member from the reacted body as an integral unit.

5. The method of forming guides for hot glass which comprises providing a container for a body of reactable aqueous slurry, said slurry composed of lime, silica and graphite, the graphite being present in an amount of approximately 50% by weight of the dry solids of the slurry, the water to solids ratio being approximately 1.8:1 by weight, defining a segregated molding portion in said container body by projecting a molding assembly therein, said assembly including a curved metal member forming the bottom side thereof, filling said container with said slurry and indurating said body of slurry and the said segregated portion at a pressure and temperature in excess of 125 p.s.i. and 173° C. respectively to substantially completely react same and bond same to said curved metal member only, removing said segregated portion and its said bonded metal member from the reacted body.

References Cited in the file of this patent

UNITED STATES PATENTS

| | | |
|---|---|---|
| 656,392 | Cook | Aug. 21, 1900 |
| 825,243 | Rieter-Bodmer | July 3, 1906 |
| 884,463 | Burgess | Apr. 14, 1908 |
| 2,131,374 | Grundwald | Sept. 27, 1938 |
| 2,432,981 | Abrahams et al. | Dec. 23, 1947 |
| 2,538,959 | Ballard | Jan. 23, 1951 |
| 2,547,127 | Kabusek | Apr. 3, 1951 |
| 2,567,592 | Ballard | Sept. 11, 1951 |
| 2,673,371 | Uhlig | Mar. 30, 1954 |
| 2,765,248 | Beech et al. | Oct. 2, 1956 |